UNITED STATES PATENT OFFICE 2,497,546

CERIUM ACETATE CONTAINING COMPOSITION

Curtis E. Griffin, Rhododendron, Oreg.

No Drawing. Application September 3, 1946,
Serial No. 694,672

2 Claims. (Cl. 106—237)

The present invention relates to a novel composition of matter comprising an aqueous-alcoholic solution of cerium acetate and an alcohol-soluble resin; which composition has been found useful for diverse applications.

The composition of the present invention can be used, for example, in the treatment of rayon goods to improve the wear-resistance, wash-resistance and other properties thereof as described in my copending application S. N. 595,077 filed May 21, 1945 and now abandoned of which the present application is in part a continuation. One result of such treatment appears to include an impregnation of the individual threads to produce a water-repellent effect which prevents water spotting of the treated materials. A most unusual property of the present composition is its action when added to any paint or like coating composition having a drying oil or drying oil-resin base of so modifying the coating composition that it will adhere to moist or damp surfaces and dry to form a mold and mildew resistant film. When suitably modified with compatible oils or waxes, the composition of the present invention can also be employed for rendering paper and the like fibrous materials water repellent. Furthermore, I have discovered that adhesives may be prepared including a minor proportion of the composition herein defined which adhesives possess new properties, notably, improved waterproof characteristics.

While the uses and applications of the material of the present invention are many and diversified, the composition itself contains only two essential ingredients, cerium acetate and an alcohol-soluble resin in addition to an aqueous-alcohol suspension medium.

Any alcohol-soluble synthetic or natural resinous product can be employed in the preparation of the composition. Examples of such resins are the alcohol-soluble terpene resins, e. g. the alcohol-soluble terpene-phenolic resinous products or the products obtained by reacting an oxyterpene with a phenol in the presence of a condensing agent. Such a resin is described in Patent 2,040,812, Norton et al. A resin of the terpene-phenol type which I have successfully used is the isomerized terpene-phenolic resin sold under the trade name "Durez #209." I can also use the so-called ester gums and polymerized ester gums obtained by reacting rosin with glycerine. Other suitable resins are the alcohol-soluble rosin-modified phenolic resins and the alcohol-soluble resins generally known as hydrated rosin-maleic resins. While an alcohol soluble resin is an essential ingredient of the composition, any such resin can be employed and the listing of the above mentioned resins is not to be taken as in any way limiting the invention thereto.

In general the compositions of the present invention will contain from 5 to 25 parts by weight cerium acetate, from 5 to 25 parts by weight of an alcohol-soluble resin, and sufficient water to dissolve the cerium acetate and sufficient alcohol to dissolve the resin. The addition of morpholine, triethanolamine, or ammonia increases the rate of solubility of the resin in the alcohol when added to the alcohol during solution of the resin.

The following illustrative example is given in order that those skilled in the art better may understand how the present invention can be carried into effect. All parts are by weight.

*Example.*—Ten parts of an alcohol-soluble resin, specifically the commercial resin known as Durez resin #209, and 10 parts of morpholine were added to 20 parts isopropyl alcohol and the resultant solution poured into 240 parts water. A solution of cerium acetate was made by dissolving 10 parts by weight cerium acetate in 100 parts water and 220 parts water was added to this solution. The water-diluted resin solution was then added with gentle agitation to the cerium acetate solution at room temperature to form a composition containing equal parts by weight of cerium acetate, resin and morpholine, the resin being in the form of a stable dispersion or suspension in the aqueous-alcohol medium.

This product may be stored indefinitely in closed containers at normal temperatures. Ordinarily, it is diluted to a substantial extent with water before use in the treatment of cellulosic materials, particularly rayon fiber materials to attain the objects given hereinbefore.

It is to be understood that the invention is not limited to the specific ingredients other than the cerium acetate given in the example. Other alcohols such as ethyl alcohol may be substituted for the isopropyl alcohol and other alcohol-soluble resins for the one specifically mentioned in the example. The morpholine or its equivalent is a desirable component of the composition in that it facilitates the solution of the resin.

In the treatment of rayon goods, the various advantages of the invention are realized to the greatest extent in connection with rayon hosiery and this application and the results thereof will be described with specific reference to the treatment of such articles. The hosiery, after first being washed in soap and water followed by a sufficient number of rinses to remove the soap, are immersed, i. e. rinsed, in a solution obtained by adding 1 part of the product of the above example to 4 parts water. The excess solution is squeezed from the hose which may now be dried at a much faster rate, i. e., at higher temperatures than untreated hose. For example, the treated hose can be placed in a moderate oven and dried in a half hour without damage or may be safely dried adjacent to the ordinary steam radiator or in front of a hot air register. The treated hose will not stretch from wear or from washing. The treatment also stops most of the wrinkling and sagging common to such products, with the result that treated hose have been found to last longer both because of the increased resistance to actual wear and because of an improved snag-resistance, both properties probably resulting from the eliminating of stretching and the fact that the impregnation of the fibers by the non-toxic and non-irritating cerium acetate-resin composition more or less seals the fibers against dirt particles, perspiration, etc. The characteristic sheen of rayon hose, which is generally regarded as objectionable, is effectively removed by the treatment, thereby enhancing the appearance of the hose.

An impregnation of the individual threads or fibers probably also accounts for the fact that while rayon fabrics treated in accordance with the present invention will wet through, since they are not waterproof, they do not water spot and hence will not show the whitish rings found on untreated hose after wetting.

Any drying oil or drying oil modified resin base paint or varnish modified by the addition of, for example, from 40 to 50 percent by weight of the compositions of the present invention can be applied to wet or damp surfaces with the same success obtained when the unmodified paints are applied to the same surfaces in the dry state. In one instance, an ordinary oil base paint modified by the addition of 40 parts of an aqueous-alcohol suspension of equal parts cerium acetate and an alcohol-soluble resin was applied to the walls of a cold storage room which normally were wet or covered with frost, the modified paint being applied directly to the wet walls with no preparation other than washing with water to remove certain stains therefrom. After more than six months, the paint film was still in excellent condition whereas the unmodified paint and various known compositions specifically sold for such applications failed to adhere to the same wet walls or to stand up for any length of time after application. In another test, a similarly modified paint was applied to the interior of the concrete walls of a basement through which seepage normally took place during rainy weather. After application of the modified paint no seepage could be detected even in the wettest seasons, the basement remaining dry even during the heaviest rains. In some cases the addition of an ester gum to the paint along with the cerium acetate-resin composition will further increase the life of the resultant film.

It is to be understood that the invention is not limited to the specific ingredients or proportions given in the above examples and that considerable latitude in the selection of the resinous component of the composition and the relative proportions of resin and cerium acetate is possible without departing from the spirit and scope of the present invention.

What I claim is:

1. A composition comprising an aqueous-isopropyl alcohol suspension of from 5 to 25 parts by weight of cerium acetate and 5 to 25 parts by weight of an alcohol-soluble resin.

2. A composition of matter essentially comprising water, a water soluble alcohol, cerium acetate and an alcohol-soluble resin, said acetate and resin being present in the proportions of from 5 to 25 parts of the acetate to from 5 to 25 parts resin, said composition containing sufficient water to dissolve the cerium acetate and sufficient alcohol to dissolve said resin.

CURTIS E. GRIFFIN.

REFERENCES CITED

The following references are of record in the file of this patent:

UNITED STATES PATENTS

| Number | Name | Date |
| --- | --- | --- |
| 1,925,914 | Zanker | Sept. 5, 1933 |
| 2,345,142 | Muller | Mar. 28, 1944 |